United States Patent [19]

Alsup, Jr. et al.

[11] Patent Number: 5,034,033
[45] Date of Patent: Jul. 23, 1991

[54] MODULAR ELECTRONIC AIR CLEANING DEVICE

[75] Inventors: James D. Alsup, Jr.; William J. Saunders, both of Decatur, Ga.; Eric H. Albrecht; Rengaswamy Ramakrishnan, both of San Antonio, Tex.

[73] Assignee: U.S. Natural Resources, Inc., San Antonio, Tex.

[21] Appl. No.: 553,537

[22] Filed: Jul. 13, 1990

[51] Int. Cl.5 .............................................. B03C 3/00
[52] U.S. Cl. ....................................... 55/126; 55/139; 55/140
[58] Field of Search ................... 55/124, 126, 139, 140

[56] References Cited

U.S. PATENT DOCUMENTS 4,240,811 12/1980 Jacobsson ............................ 55/145
4,261,712 4/1981 Kinkade ................................ 55/139

FOREIGN PATENT DOCUMENTS

931625 7/1963 United Kingdom ................... 55/139

Primary Examiner—Bernard Nozick
Attorney, Agent, or Firm—Gunn, Lee & Miller

[57] ABSTRACT

An electronic air cleaning device (10) comprised of modular subassemblies including: an horizontal base (12), two vertical walls (14a) and (14b), vertical front and rear air filter (16a) and (16b), an electronic cell (22), an electric motor (80) with a fan (82) attached thereto, and a power supply (24), which walls (14a) and air filters (16a) and (16b) are interchangeable and symmetrically related, and which releasably engage one another to facilitate assembly/disassembly with the aid of simple tools.

23 Claims, 11 Drawing Sheets

MODULAR ELECTRONIC AIR CLEANING DEVICE

FIELD OF THE INVENTION

The present invention relates to appliance cabinets in general and, more particularly to a modular, generally rectangular air cleaning device made up of releasably, nonmechanically fastened, symmetrically related subcomponents including: base, walls, lid and modular electrical components.

BACKGROUND OF THE INVENTION

Electronic air cleaners are an extremely efficient, cost effective method of removing indoor air contaminants. Unlike standard media filters that merely collect relatively large particles, electronic air cleaners attract and hold particles so small that an electron microscope is needed to see them.

Room air is drawn into the front end of the air cleaner by a small, quiet, 3-speed fan. Lint, hair and large dust particles are caught by the grill or pre-filter. Only the small, microscopic particles pass through the grill and pre-filter into the heart of the air cleaner, the electronic cell. The first section of the electronic cell ionizes the pollutant particles as they pass through the powerful electric field created by the ionizing wires. These charged particles then enter the collector section which is comprised of a series of aluminum plates of alternating positive charge and ground. The collector plates repel the positively charged particles towards the ground plates. Accumulated particles are permanently removed from the air and cling to the plates until they are washed off. The air is then pushed through an activated carbon filter to remove objectionable odors before being recirculated back into the room. This cleaning process will continue as long as room air is circulated through the air cleaner. The more the air cleaner operates, the cleaner the air will be.

Generally, the present invention includes a cabinet, one electronic cell, a 3-speed fan, two grills, one pre-filter, one carbon filter, and a high voltage power supply. The lid or access cover contains a 3-speed switch to control the fan speed. An indicator light indicates the air cleaner is operating properly. When the lid is removed, a master switch interrupts the power supply to the unit. When the carbon filter is removed, an interlock switch prevents the unit from operating even though the lid is properly in place. The air cleaner is intended for use at temperatures normally found in the home or work areas.

Electronic air cleaning devices are presently enjoying favorable acceptance with the consuming public, due in part to the increasing bias against cigarette smokers in the work and travel environments and the increasing public awareness of air pollution.

Air cleaning devices help alleviate these problems by removing particulate matter such as dust or smoke particles from the air. Air cleaning devices known in the art are generally comprised of a rectangular cabinet containing a mechanical air filter (and/or a carbon filter), an electronic cell to precipitate particulate matter, and an electrically driven fan. Frequently, these air cleaning devices, especially the larger capacity air cleaning devices designed to accommodate and cleanse the air from rooms, require routine maintenance, service or repair. This repair or servicing usually requires access to the interior components of the air cleaning device. With the prior art devices, air cleaning technicians are required to go through the laborious process of using hand tools such as screw drivers to unscrew or otherwise remove the walls or floors of the air cleaners to gain access to the electrical components. That is, prior art air cleaning devices require the use of tools such as screw drivers and pliers to remove the lids and/or side walls of the air cleaning device to gain access to the fan, electronic cell, power supply or other electronic components thereof. This time consuming effort makes both service and repair more costly.

Air cleaning devices are presently made with cabinet components such as left and right side walls and front and rear end walls, and lids. These cabinet components are asymmetrical in nature. That is, present electronic air cleaning devices require nonidentical left and right sides, and front and rear end walls, which are not interchangeable. A right side wall is not interchangeable with a left side wall nor are the front and rear end walls interchangeable.

Thus, assembly of present air cleaning devices necessitates the manufacture and assembly of left side walls and right side walls and front and rear end walls specifically, interchangeability not being featured.

Electronic air cleaning devices are presently assembled using numerous individual mechanical and electrical parts such as: a fan, a motor, a shroud, separate electrical wires, various control switches and the like. However, both the assembly and repair of such prior art air cleaning devices requires difficulty in access to and replacement of individual components.

An example of the air cleaners as described above is the Honeywell model number F59A. This air cleaning device features an exterior cabinet made of pressed wood and has a pedestal base, two side walls, a front and rear filter and a top. These exterior members are attached generally with either glue or by brackets and screws, and the interior parts: electric motor, shroud, electrical wiring, switches, are not modular but are individually attached to the base or side walls using brackets and screws. Because of the location, and mechanical mounting of the individual electrical parts of the Honeywell F59A, repair, service and routine maintenance to the Honeywell air cleaner requires the technician to remove the side walls and lid using a screwdriver or other tool, and go through the base of the device before gaining access to the power supply. Frequent dismantling of the walls of the Honeywell air cleaning device often results in the screws finally stripping their wooden thread seats.

In the manufacture and assembly of such an air cleaning device such as the Honeywell F59A described above, left and right side walls are required to be manufactured to different specifications, as is true of the front and rear end walls. Moreover, in assembly, a left side wall must be matched to a corresponding right side wall and the fan motor and other electronic parts must be mechanically mounted to specific locations within the base or side walls.

SUMMARY OF THE INVENTION

The air cleaning device as set forth herein alleviates many of the problems associated with the manufacture, assembly and service of the prior art air cleaning devices. Firstly, the air cleaning device described and claimed herein is modular in nature, being comprised of a number of unit subassemblies, including: front and rear end grill/filter brackets, two side walls, rigid base and a rigid lid to form an exterior cabinet. In addition, the cabinet interior contains unit subassemblies including: an air handling assembly, power supply assembly, contact board, an electronic cell assembly, and a wire harness. The use of modular components allows for ease of repair and servicing, as well as facilitates the manufacture and assembly of the air cleaning device.

Secondly, the subassemblies described above are designed to be substantially releasably attached to one another so that assembly/disassembly of the air cleaning device is accomplished with relative ease. More particularly, the end and side walls attach to the base without the use of tools and the interior geometry of the unit is designed to accommodate the interior subassemblies of the air cleaning device in a nonmechanical fashion which is understood to mean in a fashion which does requires only the use of simple hand tools, such as a screwdriver and mallet. The use of either toolless or nonmechanical, releasable fastening facilitates both the in-plant assembly as well as the job site service/repair of the air cleaning device.

Thirdly, several of the subassemblies set forth below, in particular the lid, the two side walls, and the two end walls, are symmetrically related. As such, no "left and right" sides are required, the sides being interchangeable with one another; likewise the front and rear walls are interchangeable with one another; finally, the lid has no front or rear and can be put on with "either end forward." This symmetry simplifies assembly/disassembly and servicing of the unit. Moreover, field offices, distributors and warehouses need not stock left and right sides or front and rear end walls, the one being identical to the other and therefore conveniencing the distribution chain to the consumer.

Fourthly, the subassemblies allow the electrical subassemblies to be seated within the walls and base of the air cleaner in such a manner that consumer access to such potentially hazardous parts is limited.

Finally, all the subassemblies of the present invention are releasably fastened to one another in such a manner as to allow toolless or nonmechanical assembly/disassembly of the entire unit.

OBJECT OF THE INVENTION

It is therefore the object of the present invention to provide for an air cleaner device comprised of modular subassemblies.

It is a further object of the present invention to provide for an air cleaning device with modular components symmetrically related and capable of being interchanged with one another.

It is a further object of the present invention to provide for an air cleaning device whose interchangeable parts nonmechanically releasably engage one another such that either no tools or only simple tools are needed for assembly and disassembly.

It is a further object of the present invention to provide for an air cleaning device with modular, interchangeable, quick engageably releasable parts thereto, which air cleaning device contains an electrical power supply in the base thereof, shielded from access.

It is a further object of the present invention to provide for an air cleaning device with modular, interchangeable walls which are releasably, engaged (without the use of tools) with a base and which further contains a lid which is releasably engaged (without the use of tools) with the upper surfaces of the walls.

It is a further object of the present invention to provide for an electronic air cleaning device with modular, interchangeable parts, which parts nonmechanically releasably engage one another, and which further contains an electrical power supply contained within a recess of a base thereto.

It is a further object of the present invention to provide for an electronic air cleaning device with modular, interchangeable parts, with walls and a lid, which lid is symmetrical and capable of being installed in front or rear relation to the air cleaning device and whose surface contains an engagement means to enable/disenable a power controlled switch of the air cleaning device.

It is a further object of the present invention to provide for an air cleaning device in which the cabinet is formed in unit subassemblies from blow-molded plastic.

Further objects of the present invention will be obvious within the spirit or scope of the claims and specifications as appended hereto.

DESCRIPTION OF THE PREFERRED EMBODIMENT

Figure 1A:
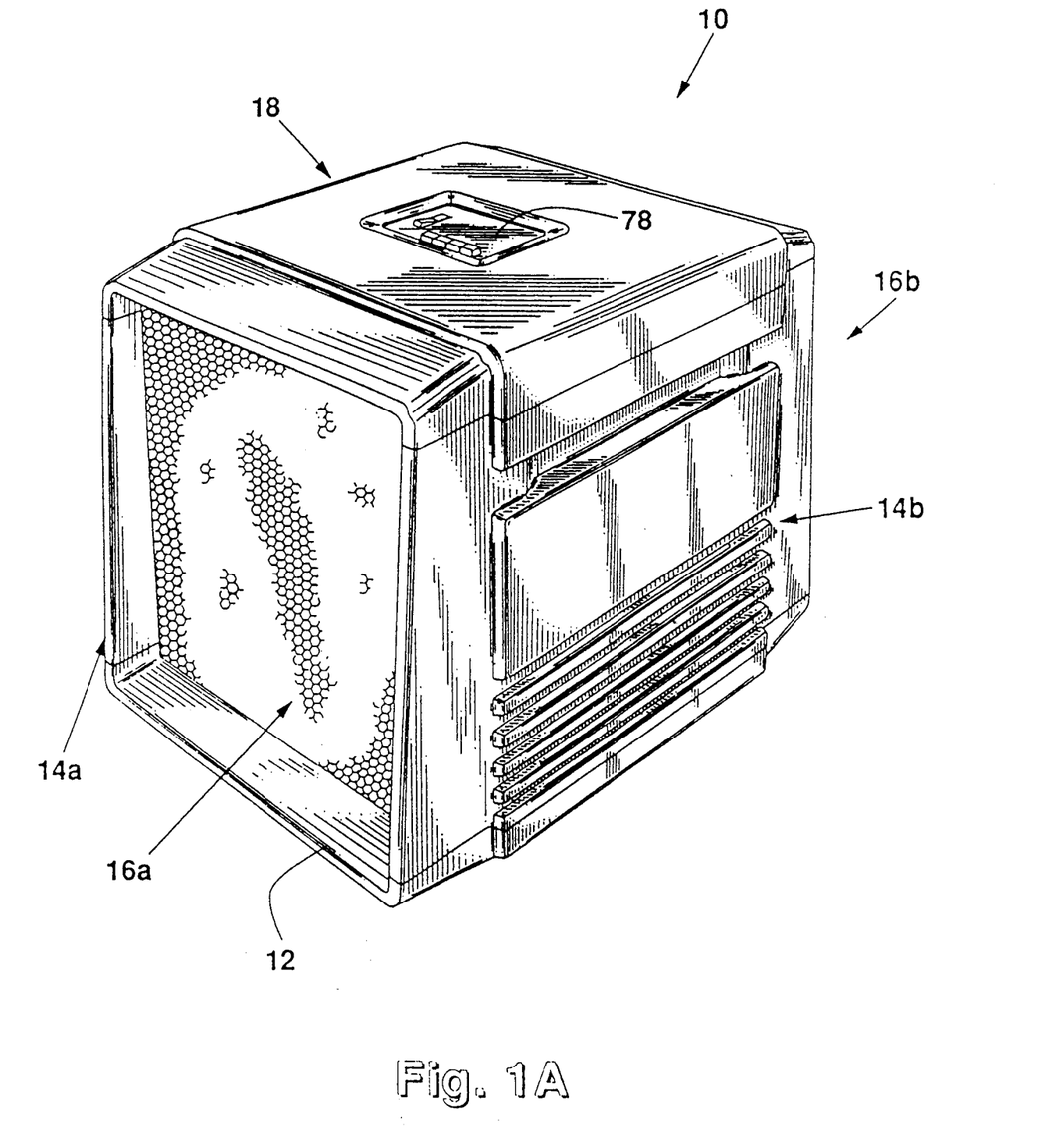
FIG. 1A is a perspective view of the air cleaning device.
Figure 1B:
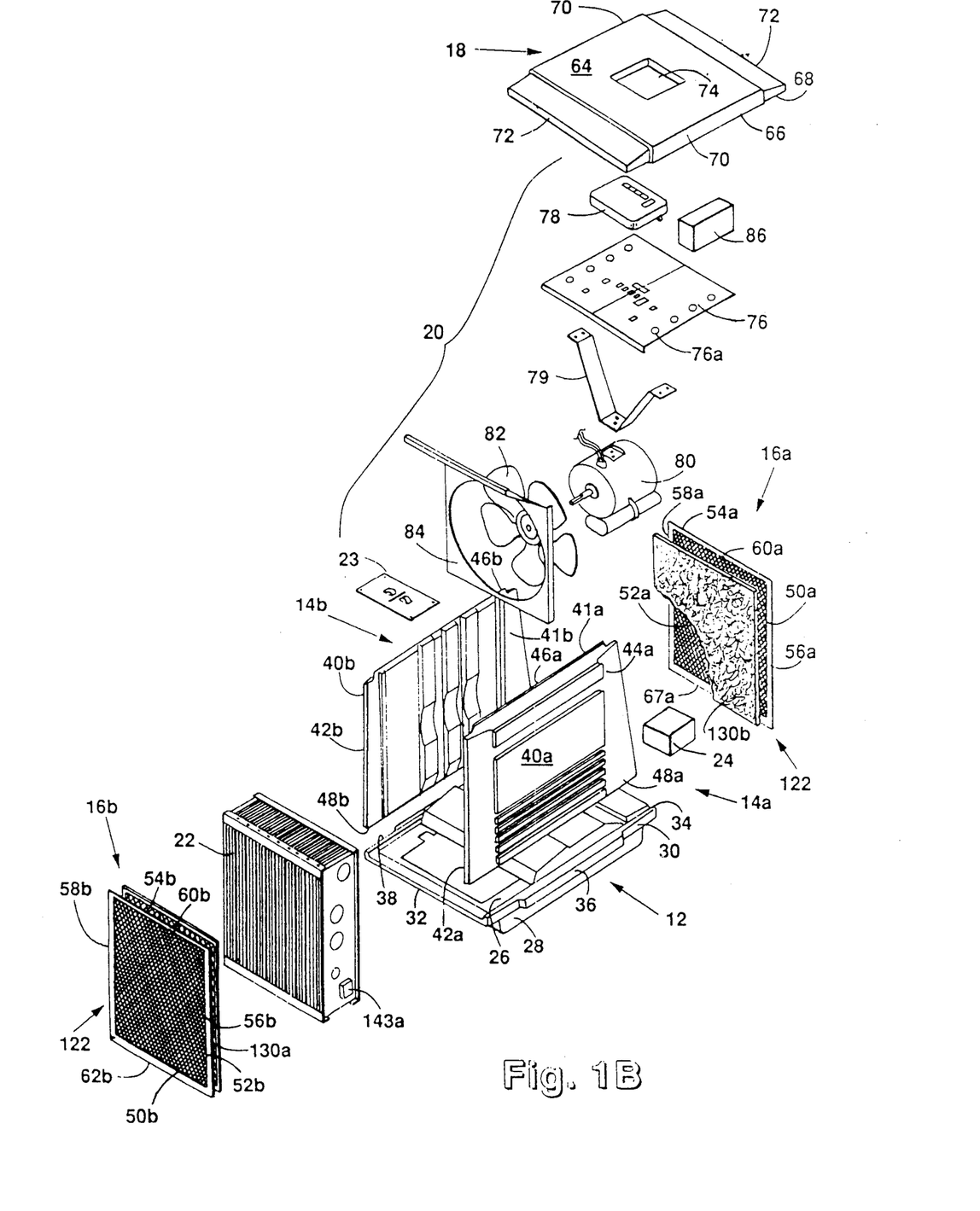
FIG. 1B is an exploded perspective view of the air cleaning device.

FIGS. 1A and 1B illustrate air cleaning device (10). The air cleaning device (10) is comprised of a number of subassemblies.

Air cleaning device (10) has a rectangular boxed shaped exterior, is comprised of base (12), symmetrical right and left sidewalls (14a) and (14b) respectively, symmetrical rear and front filter/wall means (16a) and (16b) respectively, and lid (18). These parts are releasably, nonmechanically joined as more specifically illustrated in FIG. 1B, to form a generally rectangular shaped exterior to air cleaning device (10). When in operation, the airstream through air cleaning device (10) enters through front filter/wall means (16b) and is expelled through rear filter/wall means (16a).

Base (12) is comprised of top surface (26) and bottom surface (28), which surfaces are joined by perimeter (30). Base (12) is hollow, generally rectangular and has front edge (32), rear edge (34), right edge (36) and left edge (38) which make up perimeter (30). Base (12) supports air cleaning device (10) and contains recesses on top surface (26) which recesses are dimensioned to contain and locate contact board (23) and power supply (24) as more particularly set forth in FIGS. 2A and 2B below. Contact plate (23) is located in a recess of top surface (26) and will engage electronic cell (22) along the bottom surface thereof to energize it.

Right side wall and left side wall, (14a) and (14b), respectively, are comprised of outer surfaces (40a) and (40b) and inner surfaces (41a) and (41b). The side walls (14a) and (14b) are identical, "left" and "right" and are only used for ease of referencing the diagrams. The inner and outer surfaces are joined along front edge (42a) and (42b), rear edge (44a) and (44b), top edge (46a) and (46b) and bottom edge (48a) and (48b). That is, the edges of the side walls combine to form a perimeter which joins the outer and inner surfaces of the side walls. As can be seen in FIG. 1B, both outer surface (40a) and inner surface (41b) are generally convoluted. Inner surface (41b) is a mirror image of inner surface (41a) as is outer surface (40a) identical with outer surface (40b). Not only are the surfaces identical, but each side wall is bilaterally symmetrical about the outer and inner surfaces thereof.

Side walls (14a) and (14b) connect along bottom edges (48a) and (48b) to top surface (26) of base (12) with quick, toolless fastening means to form a strong, flush joinder between perimeter (30) and the outer surfaces of the side walls. When properly affixed thereto, walls (14a) and (14b) stand generally vertical on horizontally disposed base (12).

Rear and front filter/wall means (16a) and (16b), respectively form the front and rear wall members of air cleaning device (10). Front and rear filter/wall means are dimensionally identical to one another. Filter/wall means (16a) and (16b) function to mechanically filter particulate matter such as suspended dust from the air flow and also remove odor from the air. Filter/wall means (16a) and (16b) have outer surfaces (50a) and (50b) and inner surfaces (52a) and (52b) as parts thereof. Each filter/wall means is bordered by perimeters (54a) and (54b) which perimeters are comprised of right edges (56a) and (56b), left edges (58a) and (58b), top edges (60a) and (60b) and bottom edges (62a) and (62b). Filter/wall means are generally tabular and are attached at or otherwise meet the perimeter thereof to base (12), right and left walls (14a) and (14b) and lid (18). The front filter/wall means contains mechanical filter means (130a) and rear filter wall means contains odor removing means (130b).

As seen in FIG. 1B, lid (18) comprises the top member of air cleaning device (10). Lid (18) is comprised of top surface (64) and bottom surface (66) joined by perimeter (68). More specifically, perimeter (68) is comprised of side edges (70) and end edges (72). Lid (18) is seen to contain access means (74) centrally located between side and end edges and forming an orifice therethrough, which allows the operator access to operator control panel (78). Moreover, lid (18) is symmetrical side to side and symmetrical front to rear. Lid (18) is dimensioned to snap fit (without the use of tool) to bottom surface (66) in flush relation to top edges (46a) and (46b) and (60a) and (60b) to enclose the four wall members of air cleaning device (10). Removal of lid (18) allows access to and service of air cleaning device (10).

Figure 6A:
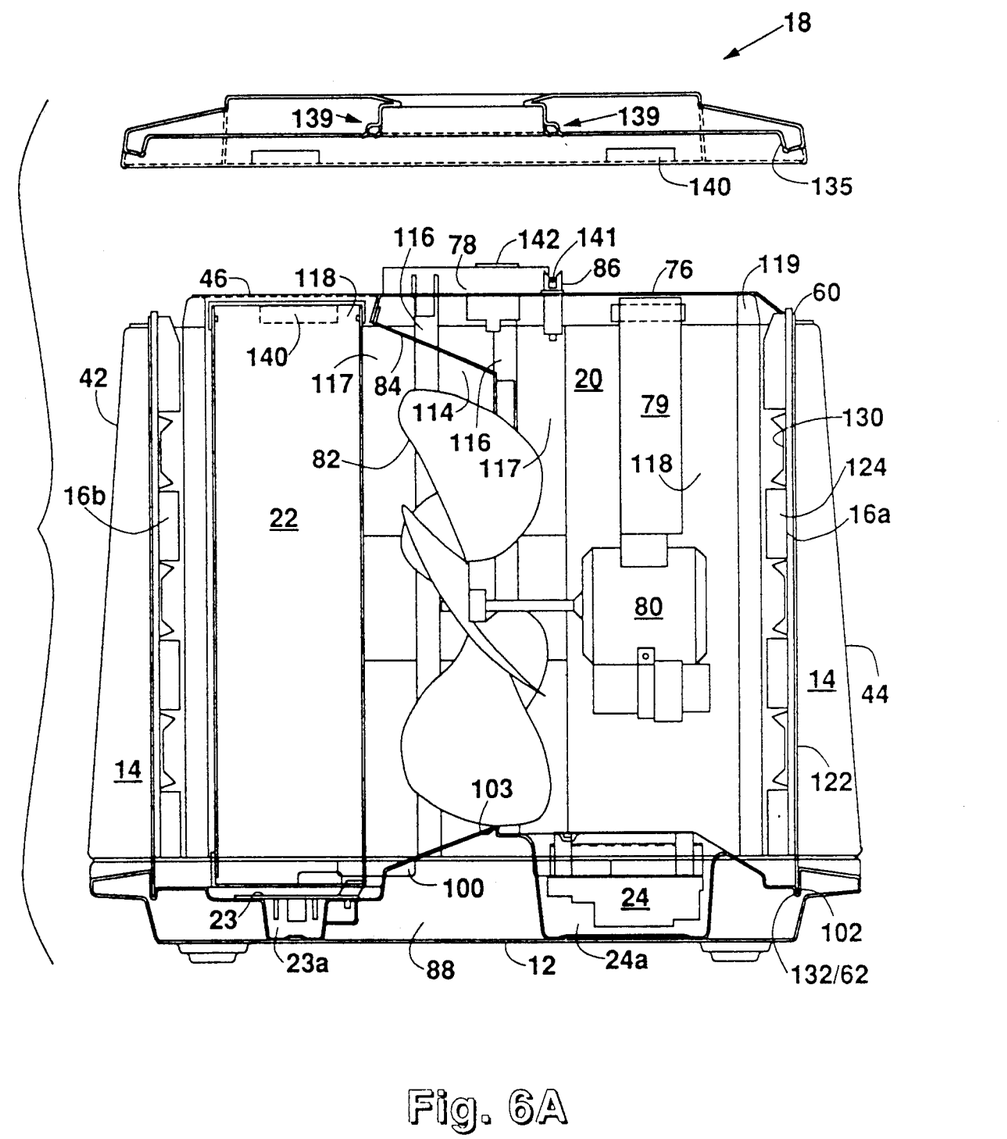
FIG. 6A is an exploded cross-sectional elevational view of the air cleaning device.
Figure 6B:
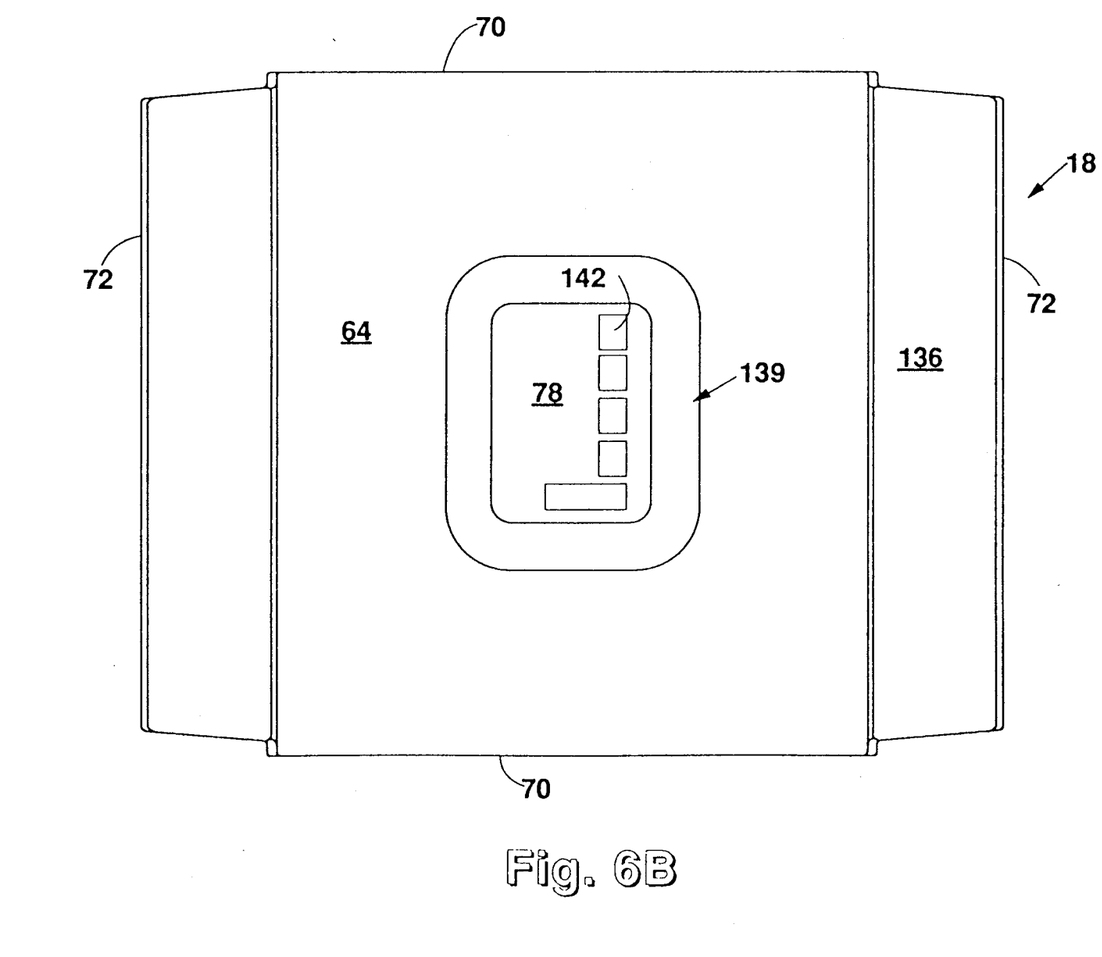
FIG. 6B is a top view of the air cleaning device with the lid in place.

Air handling apparatus (20) is dimensioned to slidably engage vertical grooves in the left and right side walls and seat into base (12). Air handling apparatus (20) is further comprised of rigid, planer, support base (76) to which operator control panel (78) is mounted on the top surface thereof and to which motor bracket (79) is mounted to the bottom surface thereof. Bracket (79) locates and supports electrical motor (80) which drives fan (82), to create an air flow through air cleaning device (10). For protection and air flow control, fan (80) is surrounded by shroud (84) which is also attached to and supported by base (76). When air handling apparatus (20) is properly engaged between walls (14a) and (14b), and lid (18) is in place, base (76) lies generally flush against bottom surface (66) of lid and operator control panel (78), projects through access means (74). Moreover, base (76) contains master switch means (86) to energize/de-energize air cleaning device (10) which master switch means is preferably located laterally to one side of control panel (78) and dimensioned to operatively engage bottom surface (66) of lid (18) as more specifically set forth in relation with the FIG. 6 below, such a fashion that when lid (18) is removed from air cleaning device (10) the operator control panel (78) is de-energized and when lid (18) is properly seated, operator control panel (78) is energized.

As air handling assembly (20) slides along vertical grooves of side walls (14) to be centrally located with air cleaning device (10), between the walls, so does electronic cell (22) slide vertically down grooves within side walls (14a) and (14b) to be located within the device. Once located, plastic or nylon fasteners such as those known in the trade as clinch type (98) are pressed through holes (76a) of base (76) and into matching holes (not shown) along top edges (46a) and (46b). In this fashion, electronic cell (22) is toollessly located within the interior of the air cleaning device and air handling assembly (20) is nonmechanically fastened therein.

Figure 2A:
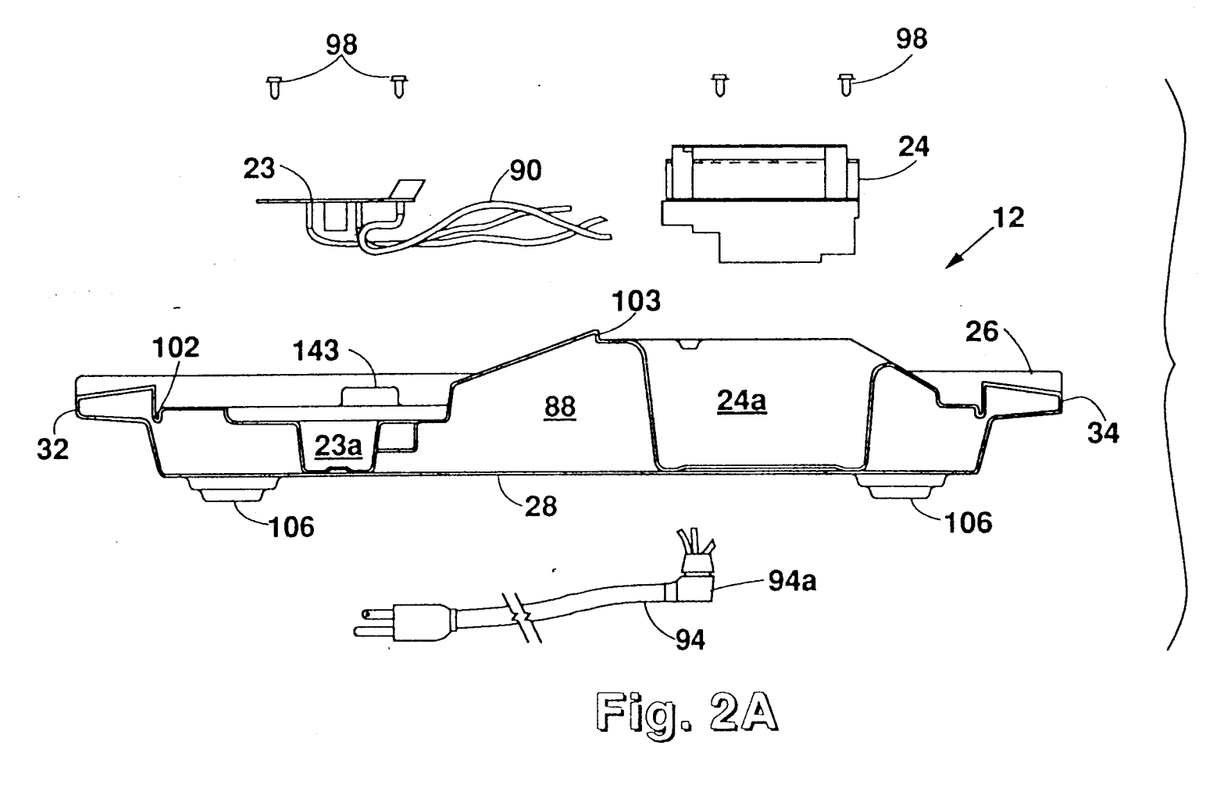
FIG. 2A is a elevational view of a section of the base of the air cleaning device exploded to show detail.
Figure 2B:
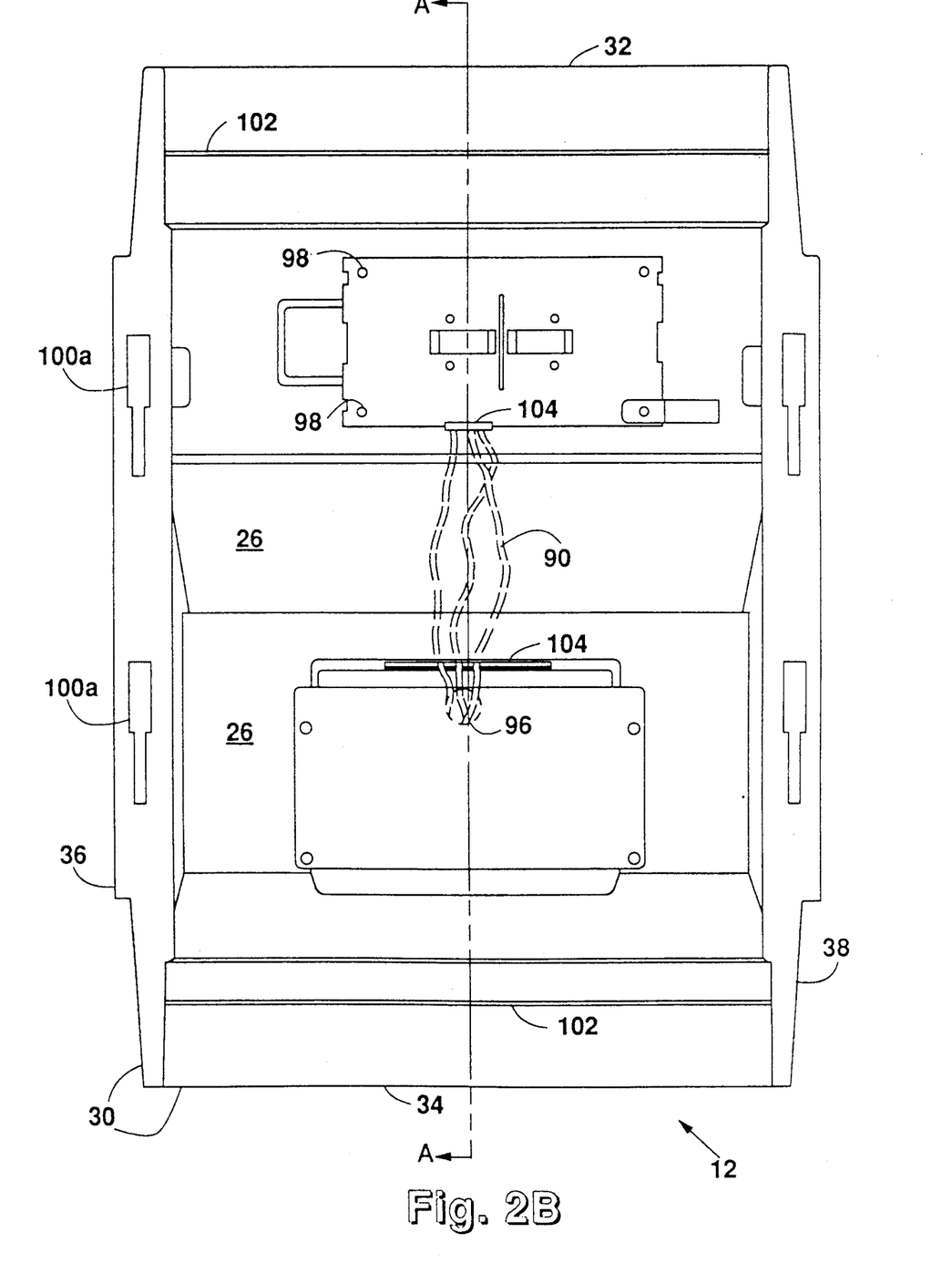
FIG. 2B is a top view of the base of the air cleaning device.

FIGS. 2A and 2B illustrate a cutaway side view and a top view, respectively, of base (12). More particularly, FIG. 2A illustrates base (12) with top surface (26) and bottom surface (28), front edge (32) and rear edge (34), and right and left edges (36) and (38) respectively. As can be seen in FIG. 2A, contact plate (23) fits into recess (23a) of top surface (26). In a like manner, power supply (24) fits into recess (24a). That is, recess (23a) and recess (24a) are dimensioned to accept contact plate (23) and power supply (24), respectively, which are fastened to top surface (26) with quick release, nonmechanical fastening means (98). Moreover, the top surface of power supply (24) is flat, with no exposed electrical contacts. It forms a top surface across recess (24a) when power supply (24) is snapped into place and thus prevents the consumer from access to the electronics of the device. Electrical energy is supplied to power supply (24) through power cord (94) which connects at a first end with power supply (24) through base (12) at hole (96). Strain relief means (94a) provides relief from pressure exerted from power cord (94) to prevent such pressure from reaching power supply (24) and creating a potential electrical hazard. Power supply (24) is energized by connection of a second end of power cord (94) to an external AC electrical energy supply. Electrical harness (90) connects contact plate (23) to power supply (24)

and is routed through hole (104) and base cavity (88). That is, hole (104) allows access for electrical harness (90) between contact plate (23) and power supply (24), when routed through cavity (88).

FIGS. 2A and 2B also illustrate the manner in which the front and rear filter/wall means and the side walls connect to base (12). More particularly, interlock means (100a) along right and left edges of base (12) are designed to be quick, nonmechanical attach/release means such as the female dovetails (designed to accept male dovetails) illustrate along bottom edges (48a) and (48b) (see FIG. 3A-3C). Interlocking means (100a) lay flush in top surface (26) adjacent to edges (36) and (38). When the side walls are joined to base (12) through interlock means (100), they meet top surface (26) and perimeter (30) in rigid, flush relation.

In addition, grooves (102) are dimensioned to accept and retain front and rear filter/wall means. Base (12) rests on feet (106) which project from bottom surface (28). As with the side walls and the lid, base (12) is preferably constructed of blow molded plastic, for example G.E. Noryl BN30.

FIGS. 2A and 2B also illustrate embossments 143 on the top surface of the base. These embossments prevent electronic cell (22) from inadvertently being placed into the air cleaning device in a reversed position. If this reverse placement is attempted, embossments (143) will engage plates (143a) (see FIG. 1B) to prevent the proper seating of the electronic cell in base (12).

As can be seen in FIG. 2B, base (12) has edges (36) and (38) which are bilaterally symmetrically positioned relative to axis A. That is, the left side and the right side of base (12) is bisected by axis A, and both halves are being substantially mirror images of one another. This symmetrical relation allows side walls (14a) and (14b) to fit on either right edge (36) or left edge (38) of top surface (26).

FIG. 2A also illustrates shroud notch (103) against which the lower edge of shroud (84) will seat when air cleaning device (10) is properly assembled.

Figure 3A:
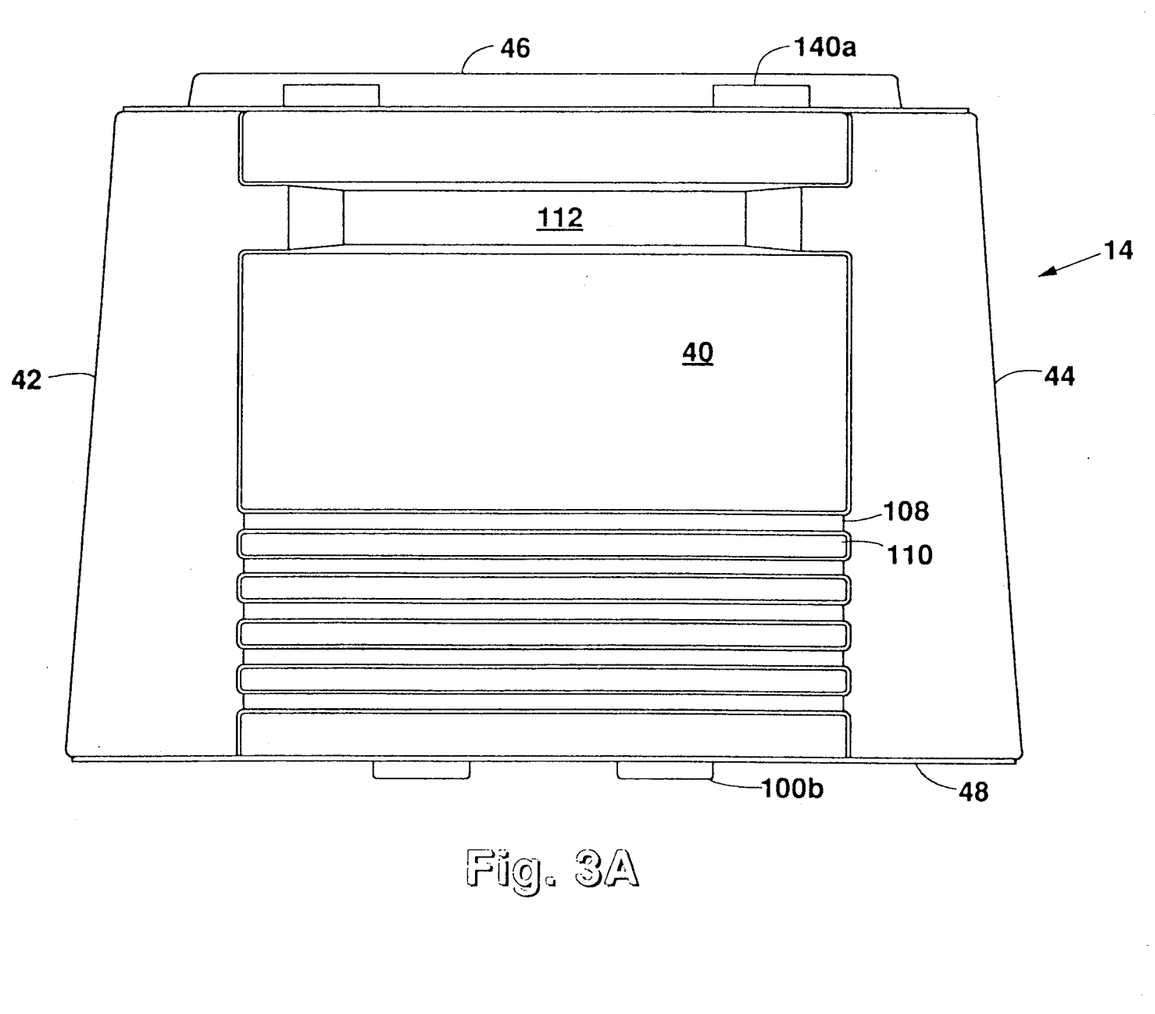
FIG. 3A is an elevational view of the side wall of the air cleaning device.
Figure 3B:
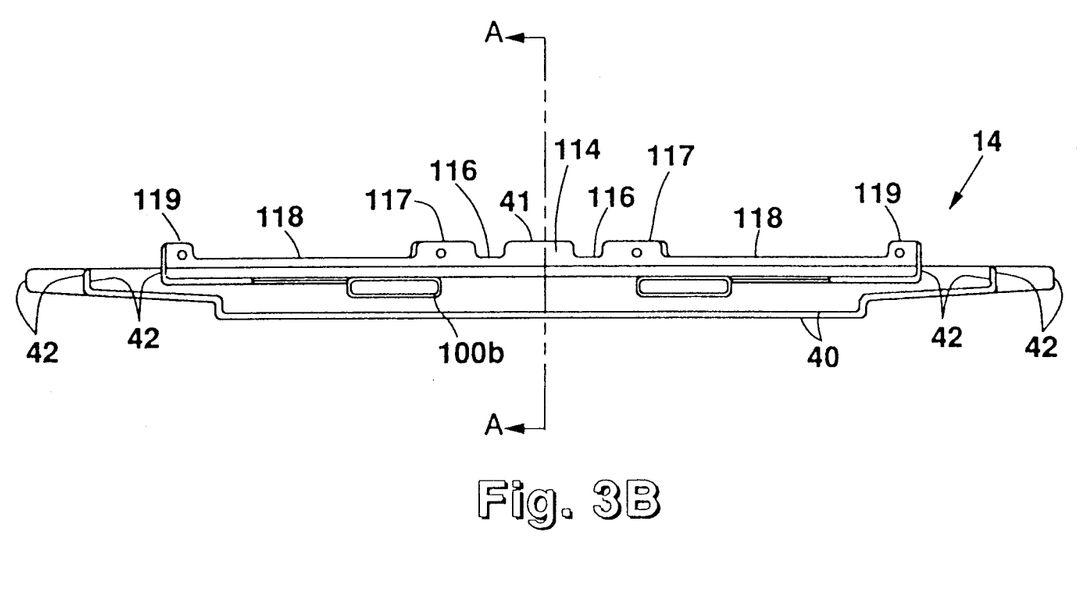
FIG. 3B is a bottom view of the side wall of the air cleaning device.
Figure 3C:
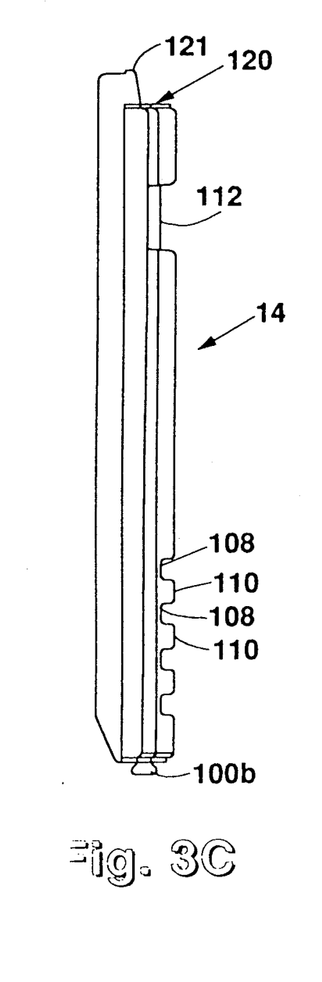
FIG. 3C is a side elevational view of the side wall of the air cleaning device.

FIGS. 3A, 3B and 3C all illustrate views of side wall (14) (meaning either right side wall (14a) or left side wall (14b), which side walls are interchangeable and identical). More particularly, FIG. 3A illustrates side wall (14) with outer surface (40) and inner surface (41) thereon. As can be seen in FIG. 3A outer surface (40) is convoluted, containing horizontal grooves (108) separated by horizontal ridges (110) near the bottom portion thereof. Further, outer surface (40) contains handle recess (112) near the top portion thereof, for lifting and carrying air cleaning device (10). Side wall (14) contains interlock means (100b) protruding from bottom edge (48), which interlock means (100b) slidably and engages interlock means (100a) of base (12), allowing the side wall to be quickly and easily attached or detached without the use of tools. The horizontal grooves and ridges function both ornamentally to create a pleasing aesthetic look to air cleaning device (10), as well as structurally to form a more rigid wall. That is, outer surface (40) and inner surface (41) are separated by a cavity, and the convolutions of the two surfaces add to the structural integrity of the wall.

As can be seen in FIG. 3B which is a top view of side wall (14), inner surface (41) contains a number of vertically extending grooves (or bays), separated by vertically extending ridges. More particularly, inner surface (41) of wall (14) has a centrally located center ridge (114) flanked laterally, equidistant therefrom and on either side thereof by parallel extending shroud bays (116). Laterally outward and equidistant from either side of shroud bays (116) and extending parallel thereto are secondary ridges (117). Laterally outward and equidistant from secondary ridges (117) are parallel extending electronic cell bays (118). FIG. 3B also illustrates vertically disposed support ridges (119) located laterally and equidistant from axis A. That is, side wall (14) is symmetrical about axis A which represents a center line of FIG. 3B. The vertically disposed ridges and bays on inner surface (41) are in generally perpendicular relation to the ridges and grooves of outer surface (40) which creates a stronger wall. Moreover, vertically disposed ridges and bays of inner surface (41) are designed to accept in sliding engagement therewith, shroud (84) (in either of shroud bays (116)) and electronic cell (22) (in either of electronic cell bays (118)).

When walls (14) are slidably engaged at interconnect means (100a) and (100b) with base (12), inner surfaces (41), with their ridges and bays therein, are in mirror symmetry to one another as more specifically illustrated in FIG. 1B. With the vertically disposed ridges and bays of inner surface (41) aligned with their identical counter parts on the adjacent inner surface, and with the walls dimensioned to be separated by the common width of electric cell (22) and shroud (84), the two mechanical subcomponents may be slidably received within walls (14a) and (14b) of air cleaning device (10).

FIG. 3A also illustrates the manner in which front and rear edges (42) and (44), respectively, taper from bottom to top so that top edge (46) is narrower than bottom edge (48). This offers a pleasing view of the exterior appearance of air cleaning device (10).

As can be seen in FIG. 3C side wall (14) has lid seat (120) just below top edge (46) and running parallel thereto to allow a toolless snap (compression) fit at lid snap (140a) between side walls and lid (18) when air cleaning device (10) is properly assembled. Lid hip (121) projects outward just above lid seat (120) to further ensure proper snap fit at (140a) between side walls (14) and lid (18). Lid snap (140) is dimensioned to engage lid hip (121) and lid seat (120) of side walls (14) to maintain structural integrity and locate lid, when air cleaning device (10) is properly assembled.

Figure 4A:
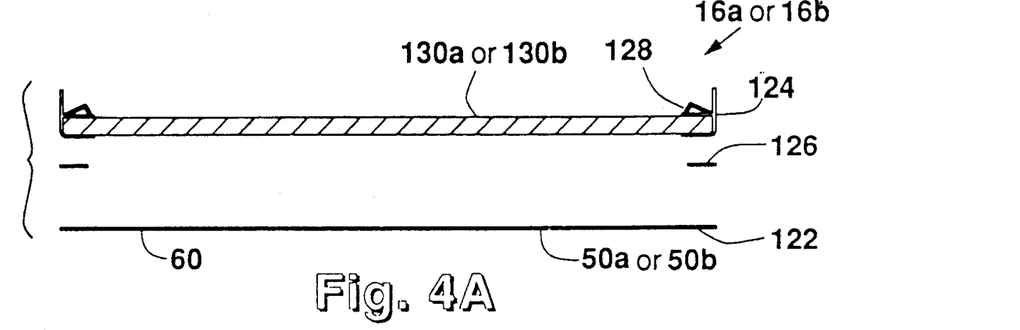
FIG. 4A is a top view of the filter/wall means of the air cleaning device.
Figure 4B:
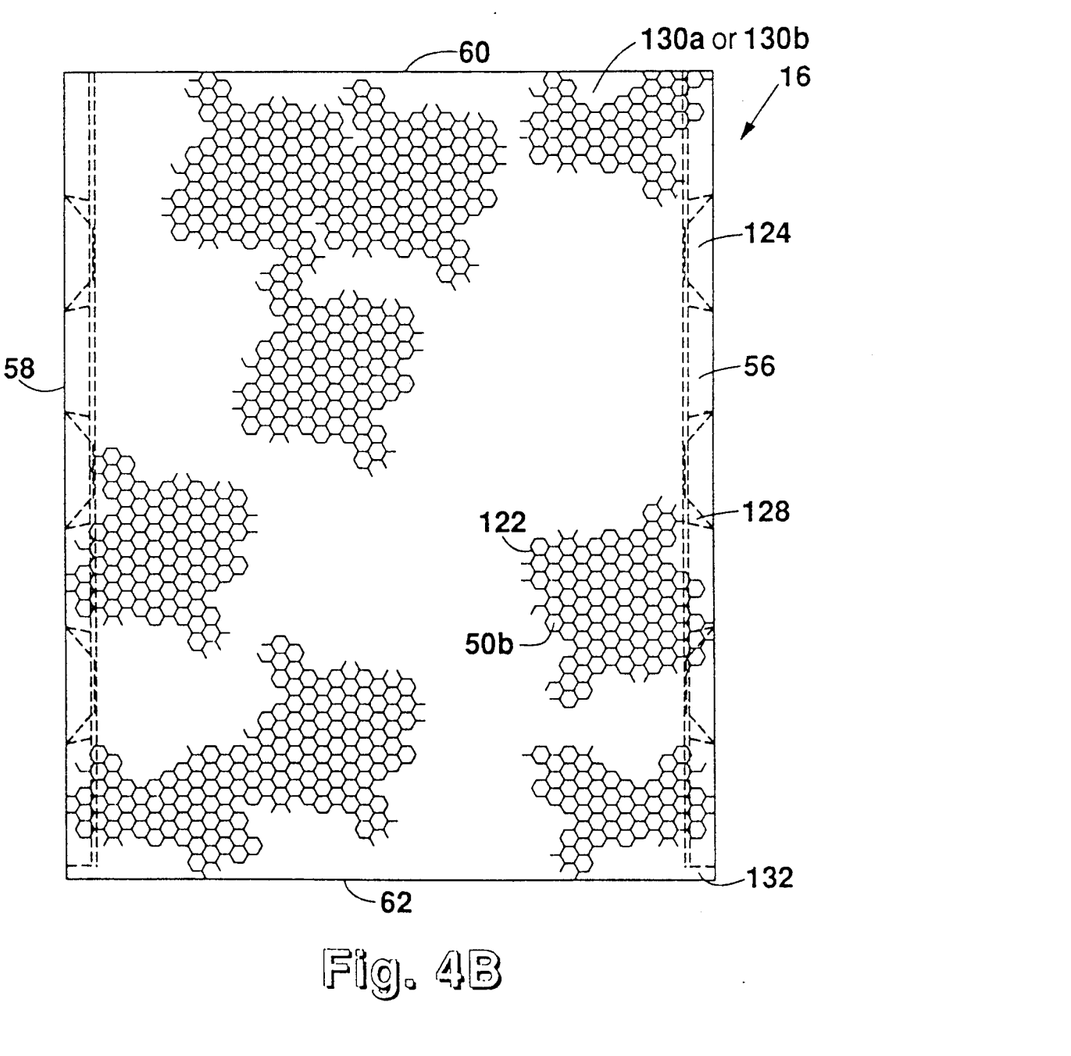
FIG. 4B is a front elevational view of the filter/wall means of the air cleaning device.

FIGS. 4A and 4B illustrate filter/wall means (16) (rear filter/wall means (16a) and front filter/walls means (16b) being dimensionally identical). Filter/wall means (16) comprises grill (122) as the outer surface (50) thereof and carbon or particulate filter (130b or 130a) as inner surface (52) thereof. Bracket (124) contains alignment tabs (128) to fixedly locate filter (130). Bracket (124) is fastened to grill (122) by tape (126) or other fastening means. As can be seen in FIG. 4B, grill (122) extends vertically below lower edges of bracket (124) and lower edges of filter (130) to form engagement lip (132). When filtering device (10) is assembled and base (12) and side walls (14) are in place, filter/wall means (16) slide vertically down onto base parallel with and adjacent to support ridges (119) until engagement lip (132) seats in groove (102) of base (12).

The carbon filter and the particulate filter (such as polypropylene fabric or foam) are dimensionally identical. The carbon filter is preferably placed so as to remove odor from the air flow as air exits the air cleaning device. This, of course, would leave the particulate filter to cleanse the incoming air flow.

Grill (122) functions to support and protect filter/wall means (16) as well as give a pleasing appearance to the front and rear views of air cleaning device (10). Moreover, grill (122) acts as a support backing to filter (130). Grill (122) is preferably constructed of 22 gauge honeycomb wire mesh or 1/4 inch hexagonal perforation. Both the grill and the carbon filter are approximately 15⅜"×12¾".

Figure 5A:
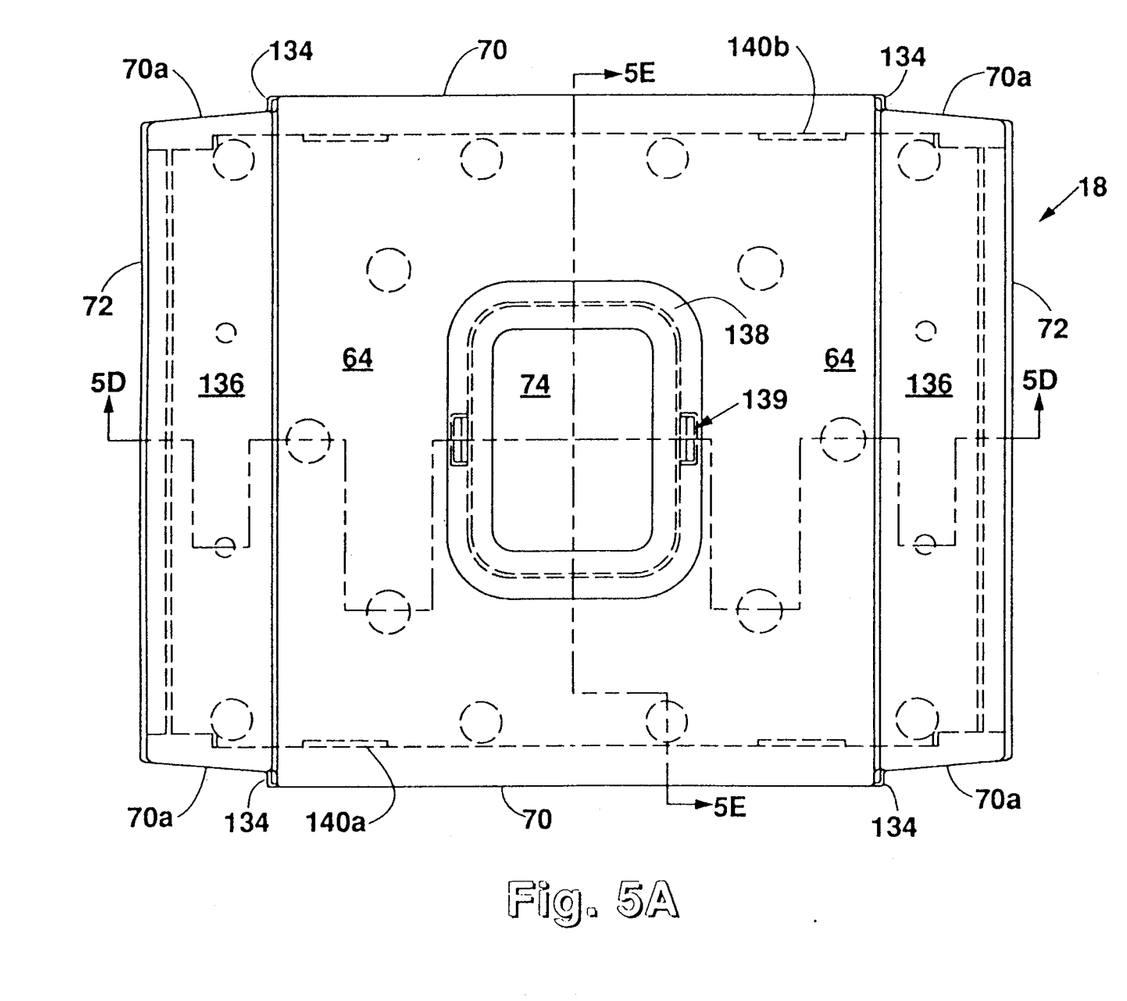
FIG. 5A is a top view of the lid of the air cleaning device.
Figure 5B:
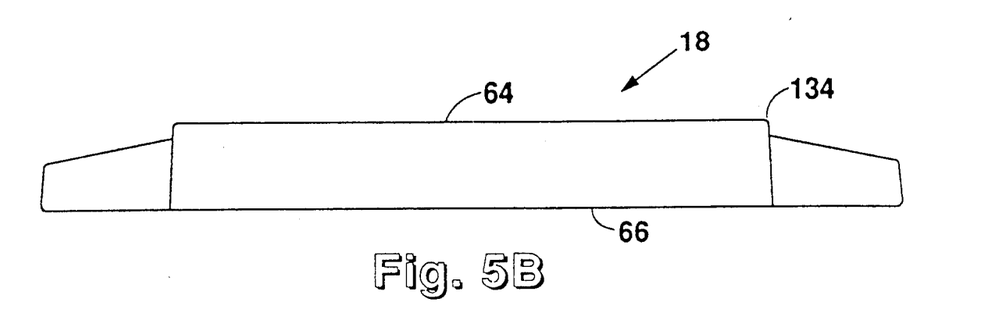
FIG. 5B is a side elevational view of the lid of the air cleaning device.
Figure 5C:
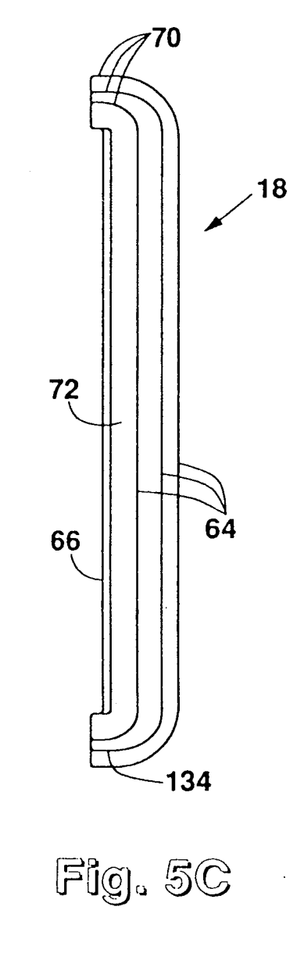
FIG. 5C is a front elevational view of the lid of the air cleaning device.
Figure 5D:
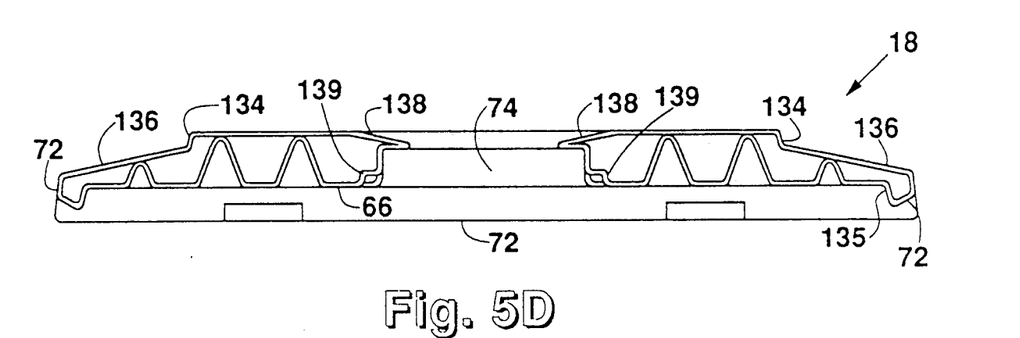
FIG. 5D is a sectional elevational view of the lid of the air cleaning device.
Figure 5E:
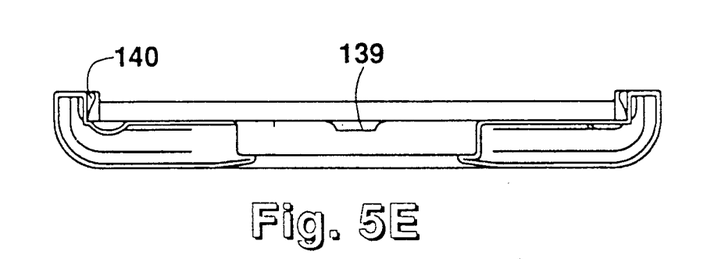
FIG. 5E is a sectional elevational view of the lid of the air cleaning device.

FIGS. 5A, 5B, 5C and 5D, illustrate various views of lid (18). Lid (18) is comprised of top surface (64) and bottom surface (66) which surfaces are joined at end edges (72) and side edges (70). More specifically, the top view of lid (18) as seen in FIG. 5A illustrates the overall shape and contours of top surface (64). Sides (70) are tapered near both ends (70a) and (70b) to join edges (72). Shoulder (134) demarcates bevelled surface (136) of top surface (64). That is, as seen more clearly in FIG. 5D, top surface (64) assumes an angular relationship to bevelled surface (136) at shoulder (134), which bevelled surface (136) represents a top surface of tapered ends (70a) of lid (18). A second bevelled surface (138) is seen in FIGS. 5A and 5D which joins top surface (64) to access means (74). Access means (74) is generally rectangular in shape and centrally located at the junction of vertical and longitudinal axes A and B as illustrated in FIG. 5A. End hip (135) secures top edge (60) of filter/wall means (14) in place when lid (18) is placed on top of air cleaning device (10). FIG. 5A, 5D and 5E also illustrate switch interaction means (139), a notch adjacent to the inboard surface of access means (74).

FIG. 6A shows air cleaning device (10) with the major subassemblies together and with lid (18) raised therefrom for clarification. This figure will be helpful in understanding the method of assembly and disassembly of the air cleaner using the unique subassemblies with their unique symmetrical relation and their quick, non-mechanical releasable fastening means.

Generally assembly of air cleaning device (10) begins with assembly of the component subassemblies of the cabinet: base (12), side walls (14a) and (14b), filter/wall means (16a) and (16b), lid (18); then air handling assembly (20), electronic cell (22), contact board (23) and power supply (24).

If contact board (23) and power supply (24) have not been previously inserted and releasably fastened to base (12), that step should be performed prior to the attachment of the side walls to the base. This is done by inserting contact board (23) into recess (23a) and inserting power supply (24) into recess (24a). The power cord and the wiring harness are attached to these components during this step. In addition, the wiring harness is attached also between power supply (24) and control panel (78). Thus, the necessary electrical attachments are completed with the insertion of the electric cell and the connection of the wiring harness between power supply (24) and control panel (78).

With the subassemblies at hand, assembly begins by inserting interconnect means (100a) to interconnect means (100b) and thus joining side walls (14) to base (12). As noted above, there is no right or left side wall per se, other than for, as here, illustrative and referral purposes. Side walls (14a) and (14b) are identical and interchangeable. Interconnect means (100) is designed to slidably engage the two parts (base and side wall) without using tools.

The next step following the attachment of the side walls to the base is the insertion of filter/wall means (16). Once side walls (14) are locked in place, support ridges (119) will act as a backing against which bracket (124) rests as the filter/wall means is slid vertically downward so that engagement means (132) along bottom edge (62) seats into groove (102). As set forth above, filter/wall means (16) are dimensionally identical. However, it should be noted that filter/wall means will be inserted between the walls such that engagement means (132) is on the bottom to seat properly in groove (102); Top edge (60) of filter/wall means (16) not having an engagement means thereon. With the insertion of the filter/wall means at the front and rear of air cleaning device (10), one now has a generally rectangular box shaped cabinet with an open top. The device is now ready for insertion of the remaining subassemblies within the cabinet.

The next step is the insertion of air handling apparatus (20) vertically downward into the shroud bay (116) that align with notch (103) of base (12). Air handling assembly (20) will slide vertically downward because shroud (84) is dimensioned to fit snugly within shroud bay (116). Support base (76) of air handling assembly (20) will lay across the open top from the top edge of one side wall to the top edge of the second side wall and with the front lip of base (76) abutting against rear of filter/wall means (16). Holes (76a) will then align with similar holes along the top edge of the walls for fitting fasteners and securing the walls to the air handling apparatus. Air handling apparatus (20) is fastened to side panels (14) at (46) by fasteners requiring a tool to release that limits access to entire compartment by consumer. With the air handling apparatus (20) thus positioned and the lower edge of air handling apparatus seated in notch (103), electronic cell (22) may be inserted into remaining (exposed) cell bay (118). In any case, insertion of air handling apparatus (20) will leave a single vacant cell bay (118) for receipt of electronic cell (22). Electronic cell (22) is dimensioned sufficiently wide and deep to snugly fit within cell bay (118) such that when electronic cell (22) is inserted completely therein, a lower surface thereof engages contact board (23) for electrical energization thereby, at the same time the top surface of electronic cell (22) remains generally flush with the top edges of the side walls. However, there is a front and rear to the electronic cell and the embossments on the base and the plates on the sides of the electronic cell will prevent a backwards installation.

Placing lid (18) on the otherwise properly assembled air cleaning device (10) allows the inner walls of the lid to nonmechanically snap fit with outer surface (40) of side walls (14) at (140). As this occurs, positioning means (135) slips over top edge (60) of front and rear filter/wall means (16a) and (16b), to positionally maintain the same.

Control panel (78) controls energy distribution through the wiring harness to motor (80), electronic cell (22) and other electrical components within air cleaning device (10). That is, as further seen in FIG. 6A and 1B, control panel (78) has an on/off switch as well as switches which can selectively control the fan speed (from off) to one of three preselected values. However, master switch means (86) is capable of deenergizing the operator control panel (78) when the lid is removed. That is, placement of lid (18) on the top of an otherwise complete air cleaning device (10) causes a depression of switch plunger (141) which energizes operator switches (142).

When air cleaning device (10) is in operation and properly assembled, fan (82) is energized through engagement of operator switches (142) to energize motor (80) and electronic cell (22). Fan (82), so energized, draws air through one filter/wall means and expels it through the second. The direction of air flow through air cleaning device (10) is determined by the direction in which the air handling assembly is inserted. The maintenance of an air flow through the cavity of air cleaning device (10) allows the electronic cell and the mechanized filter to extract particulate and suspended matter in the air and thus effectively cleanse the air.

By recessing power supply (24) and contact boards (23) into recesses (24a) and (23a), respectively, consumer/assembler access to such potentially hazardous electrical devices is limited. Moreover, the planer, top surface of power supply (24) as positioned will be subject to the air flow during operation of air cleaning device (10) and thus act as a more effective heat sink for the temperatures generated during operation. Contact board (23) and power supply (24) may be fastened within their respective recesses using quick release, nonmechanical fastening means such as Tinnerman C60207AA.

As can be seen in the illustrations accompanying these specifications, the base, walls and lid of air cleaning device (10) contain numerous convolutions on their exterior surfaces. Moreover, each of these generally tabular members are hollow. Novelty lies, in part, in the shape of these tabular members; the preferred embodiment includes walls, a base and a lid formed from blow molded plastic such as G. E. Noryl BN30. Electronic cell (22) described herein is preferably a Honeywell FC37A1130 with contacts along the bottom surface thereof and a handle at top. The grill assembly is preferably 24 gauge galvanized steel and the filter a carbon impregnated filter such as that manufactured by Permatron, Inc. of 10134 Pacific Ave., Franklin Park, Ill. 60131.

General exterior dimensions of the cabinet are 19 3/16"×15 1/16"×21½". The general dimensions of the electronic cell are 15⅝"×12 7/16"×4⅜". The use of blow molded plastic gives a futuristic appearance to the air cleaning device. Moreover, it facilitates different contouring of outside and inside surfaces of the same member. Heretofore, appliance cabinets in general and air cleaners in particular have been made of wood boards and screws, structural or sheet plastic, compression or injection molded plastic. For example, Panasonic has an air cleaner that is constructed from injection molded plastic. It is more difficult for the wall, base and lid members required for the present invention to be formed by these methods.

Power supply such as that described herein is available from Honeywell as part no. 220429E.

Thus, it can be seen that air cleaning device (10) may be rapidly and easily assembled with only the use of simple tools, such as a screwdriver and a mallet. Moreover, servicing of air cleaning device (10) is facilitated by constructing the device with unit subassemblies, which unit subassemblies quickly and easily assemble and disassemble either without tools or with only simple hand tools. Moreover, the unit subassemblies may be designed, as they are here, with unique symmetrical relations between corresponding component parts, further easing the manufacture, assembly and service thereof by requiring no "left or right" parts with respect to front, rear and side walls, therefore avoiding mix ups such as ordering the wrong part, etc. At the same time, use of electrical subassemblies such as the contact board, power supply and wiring harness in conjunction with base contained recesses not only make for ease of assembly, disassembly and service but limit access to those electrical components by the consuming public. The use of a lid with a symmetrical relation set forth above and the switch engagement means described herein, allows the lid to fit on the air cleaning device in either direction. Singly and in combination these features performs a unique and useful function.

Terms such as "left," "right," "up," "down," "bottom," "top," "front," "back," "in," "out," and the like are applicable to the embodiment shown and described in conjunction with the drawings. These terms are merely for the purposes of description and do not necessarily apply to the position of manner in which the invention may be constructed or used.

While the invention has been described in connection with performed embodiment, it is not intended to limit the invention to the particular form set forth, but on the contrary, it is intended to cover such alternatives, modifications and equivalents that may be included within the spirit and scope of the invention as defined by the appended claims.

We claim:

1. An air cleaning device comprising:
   a generally horizontal base, said base with a contoured top surface and a bottom surface thereon, the top surface and the bottom surface being joined at a perimeter, said base being generally rectangular in shape and having toolless, releaseable attachment means thereon;
   generally vertical left and right walls means, said left and right wall means being symmetrically related, each of said left and right wall means having an inner and an outer surface thereon, the inner and outer surfaces being contoured and joined at a perimeter, and said left and right wall means having toolless, releasable attachment means;
   generally vertical front and rear filter means, each of said front and rear filter means having a front surface and back surface, a top edge and a bottom edge, and a left edge and a right edge, said front and rear filter means being generally rectangular and symmetrically related, said front and rear filter means dimensioned to slidably engage the inner surface of said wall means and to releasably engage, along the bottom edge, the top surface of said base, said front and rear filter means forming a front and rear wall to said air cleaning device and capable of removing particulate matter from the air;
   a generally horizontal lid, said lid having a top surface and a bottom surface thereon, the top surface and the bottom surface being joined at a perimeter, said perimeter forming two ends and two sides, said lid being generally rectangular and having toolless, releasable attachment means along the perimeter thereof for releasably attaching said lid to said right and left wall means;
   an air handling assembly;
   an electrical control panel;
   a power supply;
   a wiring harness; and
   an electronic cell;
   wherein said air handling assembly and electronic cell are releasably and positionally arranged within said left and right wall means by nonmechanical attachment means.

2. The device as described in claim 1 wherein the attachment means of said base includes a female dove tail and the attachment means of said walls includes a male dove tail wherein the female dove tail and the male dove tail operatively engage to couple said base to said wall means in flush relation, with said wall means extending generally perpendicularly from said base when so engaged.

3. The device as described in claim 1 wherein the attachment means of said base includes a longitudinal groove, said longitudinal groove for releasably engaging the bottom edge of said filter means.

4. The device as described in claim 1 wherein the attachment means of said wall means includes bays on the interior surface thereof, said bays dimensioned to vertically and slidably engage said air handling assembly and said electronic cell and to laterally support said air handling assembly and said electronic cell within said wall means.

5. The device as described in claim 1 wherein the attachment means of said lid includes a lip and the attachment means of said wall means includes a seat, wherein the lip of said lid operatively engages the seat of said wall means to nonmechanically, releasably engage said lid to said wall means.

6. The device as described in claim 1 wherein said base further comprises recess means, said recess means dimensioned to receive and at least partially surround said power supply.

7. The device as described in claim 1 wherein said base is hollow, and wherein at least a part of said wiring harness is carried between the top surface and the bottom surface of said base.

8. The device as described in claim 1 wherein said base, said wall means and said lid are manufactured from blow molded plastic.

9. The device as described in claim 1 further comprising an electrical contact plate, said electrical contact plate for operatively engaging and energizing said electronic cell, wherein said electrical contact plate is mounted to the top surface of said base for making contact with said electronic cell when said electronic cell is inserted into the air cleaning device.

10. The device as described in claim 1 further comprising an interlock switch means, said interlock switch means for enabling said power supply when said lid is attached to the air cleaning device and disenabling said power supply when said lid is removed from the air cleaning device.

11. The device as described in claim 1 wherein said lid includes a centrally located access means therein, said access means for allowing access to said control panel when said lid is engaged to the air cleaning device, and wherein said lid is symmetrically related to the air cleaning device such that said lid may be properly fitted to the air cleaning device with either end forward.

12. The device as described in claim 1 further comprising a filter interlock switch means in operative association with one of said front or said rear filter means for enabling said power supply when said filter means is in place in the device and for disabling said power supply when said filter means is removed from the device.

13. The device as described in claim 1 further comprising a strain relief means operatively coupled to said base and to an electrical conductor connecting an external source of energy to said power supply, wherein said strain relief means absorbs forces applied to the conductor to substantially prevent the transfer of those forces to said power supply.

14. The device as described in claim 1 wherein said rear filter means further includes means for removing odor from the air. Said removing means being an activated carbon pad and said front filter means includes a foam pad.

15. The device as described in claim 1 wherein said base further includes lockout means, said lockout means for preventing the inadvertent insertion of said electronic cell in an improper position.

16. An air cleaning device comprising:
a generally horizontal base, said base with a contoured top surface and a bottom surface thereon, the top surface and the bottom surface being joined at a perimeter, the perimeter with a front edge, two side edges, and a rear edge, said base being generally rectangular in shape and having toolless releasable attachment means thereon, wherein the attachment means of said base further comprises a female dovetail adjacent to the side edges and a longitudinal groove adjacent to the front edges and a recess means in the bottom surface thereof;
generally vertical left and right wall means, said left and right wall means being symmetrically related, each of said left and said right wall means having a contoured inner and a contoured outer surface thereon, said inner and outer surfaces being joined at a perimeter, the perimeter having a top edge and a bottom edge and a front edge and a rear edge, said left and said right wall means being generally rectangular, and said left and said right wall means having releasable attachment means, the attachment means comprising a male dovetail along the bottom edge of the perimeter of said wall means, said male dovetail for operatively engaging the female dovetail of said base, to attach said base to said wall means in flush relation, with said wall means extended generally perpendicular from said base when so engaged, the attachment means further comprising a vertically extending support ridge near the front and rear edges thereof, the attachment means further including bays in the inner surfaces of said wall means, and a seat adjacent to the top edge;
generally vertical front and rear filter means, each of said front and rear filter means having a front surface and a back surface, a top edge and a bottom edge, and a left edge and a right edge, said front and rear filter means being generally rectangular and symmetrically related, said filter means dimensioned to slidably engage the inner surface of said wall means along the vertical extending support ridges thereof and to releasably engage, along the bottom edge, the longitudinal groove in the top surface of said base, said front and rear filter means forming a front and rear wall to said air cleaning device and capable of removing particulate matter and offensive odors from the air;
a generally horizontal lid, said lid having a top surface and a bottom surface thereon, the top surface and the bottom surface being joined at a perimeter, said lid being generally rectangular and having toolless, releasable attachment means along the perimeter thereof for releasably attaching said lid to said right and said left wall means, wherein the attachment means of said lid includes a lip, wherein the lip of said lid operatively engages the seat of said wall means to releasably engage said lid to said wall means, wherein said lid is symmetrically related to the air cleaning device such that said lid may be properly fitted to the air cleaning device with either end forward;

an air handling assembly, said air handling assembly including a fan, a shroud, and a motor for creating an airstream through the air cleaning device;

an electronic cell for electronically charging particles suspended in the airstream then removing the charged particles from the air;

a wiring harness connecting all the electrical components of the air cleaning device;

an electrical control panel for controlling energy distribution through said wiring harness to said electronic cell and said air handling assembly; and an electrical contact plate, said electrical contact plate for operatively engaging and energizing said electronic cell, said electrical contact plate being mounted to the top surface of said base for making contact with said electronic cell when said electronic cell is inserted into the air cleaning device;

wherein said air handling assembly and said electronic cell are releasably and positionally arranged between said left and said right wall means by the bays on the inner surfaces of said left and said right wall means.

17. The device as described in claim 16 wherein said base, said wall means and said lid are comprised of blow molded plastic.

18. The device as described in claim 16 wherein said lid further comprises an interlock means for energizing said air cleaning device when said lid is in place and for deenergizing said air cleaning device when said lid is removed therefrom.

19. The device as described in claim 18 wherein said lid further comprises an access means, centrally located thereon, for allowing access to said electrical control panel when said lid is in place on said air cleaning device.

20. The device as described in claim 16 further comprising a filter interlock switch means in operative association with one of said front or said rear filter means for enabling said power supply when said filter means is in place in the device and for disabling said power supply when said filter means is removed from the device.

21. The device as described in claim 16 further comprising a strain relief means operatively coupled to said base and to an electrical conductor connecting an external source of energy to said power supply, wherein said strain relief means absorbs forces applied to the conductor to substantially prevent the transfer of those forces to said power supply.

22. The device as described in claim 16 wherein said front filter means includes a hexagonal mesh grill and a polypropylene sheet and said rear filter means includes a hexagonal mesh grill and an activated carbon sheet.

23. The device as described in claim 16 wherein said base further includes lockout means, said lockout means for preventing the inadvertent insertion of said electronic cell in an improper position.

* * * * *